United States Patent [19]
Ponce

[11] Patent Number: 5,735,324
[45] Date of Patent: Apr. 7, 1998

[54] MITER BOX WITH ELECTRONIC MEASURING OF LUMBER

[76] Inventor: Felix C. Ponce, 6725 Bovey Ave., Reseda, Calif. 91335

[21] Appl. No.: 609,714

[22] Filed: Mar. 1, 1996

[51] Int. Cl.⁶ .................................................. B27G 5/00
[52] U.S. Cl. .................. 144/216; 33/773; 83/522.21; 384/297
[58] Field of Search .................... 33/555.1, 734, 33/762, 763, 772, 773, 774, 778; 384/297; 83/522.11, 522.21

[56] References Cited

U.S. PATENT DOCUMENTS

| | | | |
|---|---|---|---|
| 1,275,370 | 8/1918 | Best | 33/773 |
| 3,077,804 | 2/1963 | Manaloris | 83/345 |
| 3,597,847 | 8/1971 | Anderson | 33/773 |
| 3,709,078 | 1/1973 | Mills | 83/522.21 |
| 3,972,124 | 8/1976 | Mikolajczyk | 33/772 |
| 4,050,160 | 9/1977 | Schmitt | 33/778 |
| 4,577,411 | 3/1986 | Martin . | |
| 5,027,526 | 7/1991 | Crane | 33/763 |
| 5,142,793 | 9/1992 | Crane | 33/763 |
| 5,197,200 | 3/1993 | Bahr et al. | 33/773 |
| 5,220,731 | 6/1993 | Waclawik et al. | 33/773 |
| 5,301,427 | 4/1994 | Swatek | 33/773 |

*Primary Examiner*—W. Donald Bray
*Attorney, Agent, or Firm*—Lewis B. Sternfels

[57] ABSTRACT

The invention is directed to measuring the length of a piece of wood to be cut in a miter box, a frame and trim saw, a radial saw and the like. The miter box includes a back (24) having a surface (24a) against which the piece of wood is placed and slid into position for cutting by the saw blade of the miter box. A roller (30) is positioned at and extends slightly beyond surface (24b), and is mechanically and thence electrically connected to a LCD display (54). The roller is mechanically connected to a rotary disc (42) by any suitable means, such as by a secondary roller (34) and gears or by a cord (40) and pulley mechanism. Wiper contacts 60 are slidable on and against a surface of disc (42), and are electrically connected to LCD display (54). A reset switch (68) and/or a spring switch on surface (24a) enables the reading on display (54) to be reset, for example, to ½" which is the distance from a starting point and the path of saw blade travel. In operation, linear movement of the wood towards the saw blade cutting position causes roller (30) to rotate. This rotation is translated through disc (42) and wiper contacts (60) to conversion mechanism (58) and thence to display (54) to illustrate the distance of linear travel in the display. The read out from the display thus measures the length of wood to be cut.

13 Claims, 4 Drawing Sheets

5,735,324

MITER BOX WITH ELECTRONIC MEASURING OF LUMBER

BACKGROUND OF THE INVENTION

1. Field of the Invention

The present invention relates to miter boxes, frame and trim saws, radial saws and the like and to improvements in self-contained measuring of lumber to be cut therein.

2. Description of Related Art and Other Considerations

A miter box, a frame and trim saw, a radial saw and the like provides a cleanly cut end to a piece of lumber and to provide the end with a desired angle, whether it be square or at another angle to the board. At the same time, the board is measured so that the end to be cut is used also to determine the length of board needed. Conventionally, the length of the board is obtained with the aid of a conventional tape or like measure to enable the length to be marked on the board, and the cut is made as indicated by the mark on the board. While simple and effective, this technique has some draw backs. First, it requires use of a separate measuring device which may be unavailable, perhaps being used by another or having been lost or mislaid. Second, several steps in handling the board, measuring it using the tape measure, placing the tape measure aside, placing the measured board in the miter box, and cutting it. Therefore, there is need for avoiding these problems.

SUMMARY OF THE INVENTION

These and other problems are successfully addressed and overcome by the present invention. Measuring apparatus is incorporated and combined within the miter box. Preferably, the measuring instrument is electronically operated. The linear movement of the board is picked up mechanically as it is moved along a surface of the miter box toward the saw blade. This mechanical movement is converted into electrical signals and shown in a display as units of linear measurement in the English or metric system. The display is automatically preset to a predetermined value whenever a new board is placed on the miter box. The switch which enables such resetting is also an important novel feature of the present invention, for example, by being reset only when a new board is placed in the miter box, so that the former board's measure may be retained if needed.

Several advantages are derived from this arrangement. Measurement of lumber is easily facilitated. Separate measuring instruments or tapes are eliminated. A record of board length is retained until a new board is placed in the miter box.

Other aims and advantages, as well as a more complete understanding of the present invention, will appear from the following explanation of an exemplary embodiment and the accompanying drawings thereof.

DETAILED DESCRIPTION OF THE PREFERRED EMBODIMENT

Figure 1:
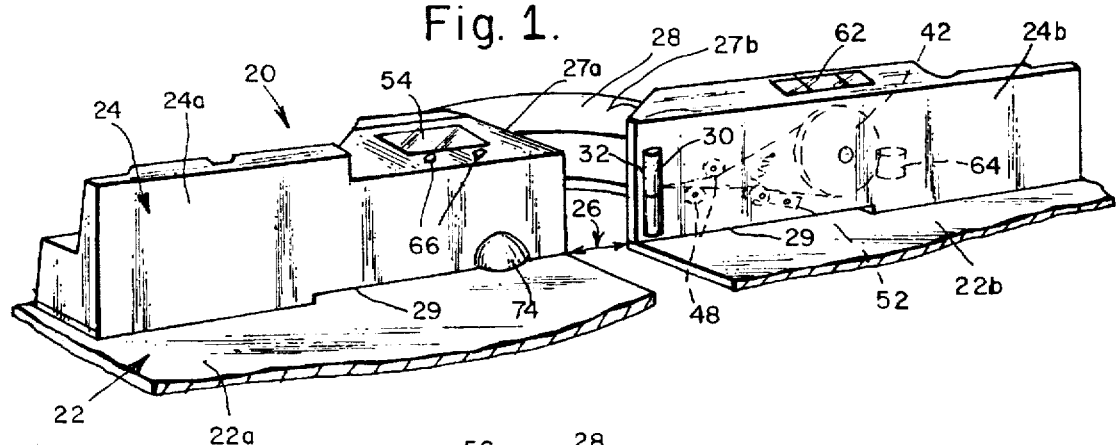
FIG. 1 is perspective view of a preferred embodiment of the present invention depicting a miter box, frame and trim saw, radial saw and the like (represented by its lumber guiding portion) in combination with electro-mechanical implementation for linearly measuring a board.

FIG. 1 depicts a miter box 20 of conventional construction as modified by inclusion of the measuring device of the present invention. The miter box includes a base 22 and a back 24 which are disposed to receive a board. Both the base and the back are separated at their center into base halves 22a and 22b and back halves 24a and 24b to form an aperture 26 having a pair of rearwardly sloping walls 27a and 27b. A rotary saw blade is positioned within aperture 26 and can be pivoted by sloped back walls 27a and 27b. A rearwardly extending connector 28 secures the base and back halves together into a unit. Back 24 includes surfaces 25a and 25b whose purposes will be described below, and openings 29 into which sawdust or debris from cuttings may be received.

Figure 3:
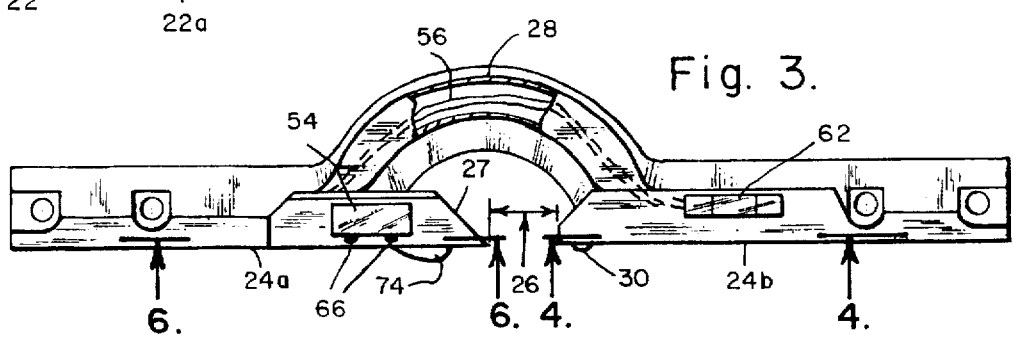
FIG. 3 is a top view of the embodiment of in FIG. 1.
Figure 4:
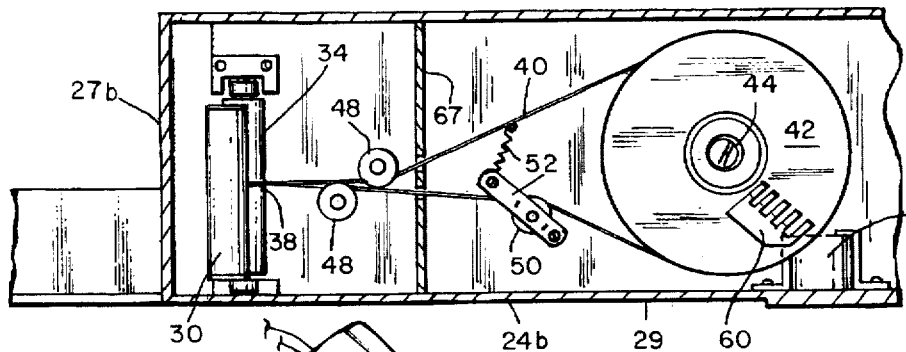
FIG. 4 is a partial front view of the embodiment shown in FIG. 3, taken along line 4—4 thereof, with the front panel thereof removed, to illustrate primarily the mechanical portion of the electro-mechanical implementation.
Figure 5:
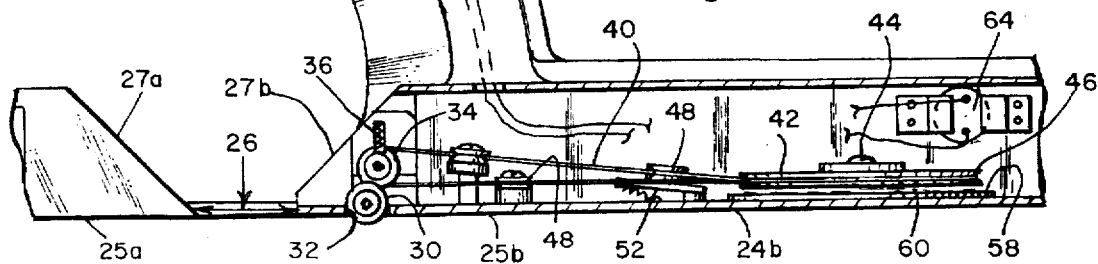
FIG. 5 is a partial top view of the mechanical portion of the electro-mechanical implementation depicted in FIG. 4, with the top panel thereof removed.
Figure 2:
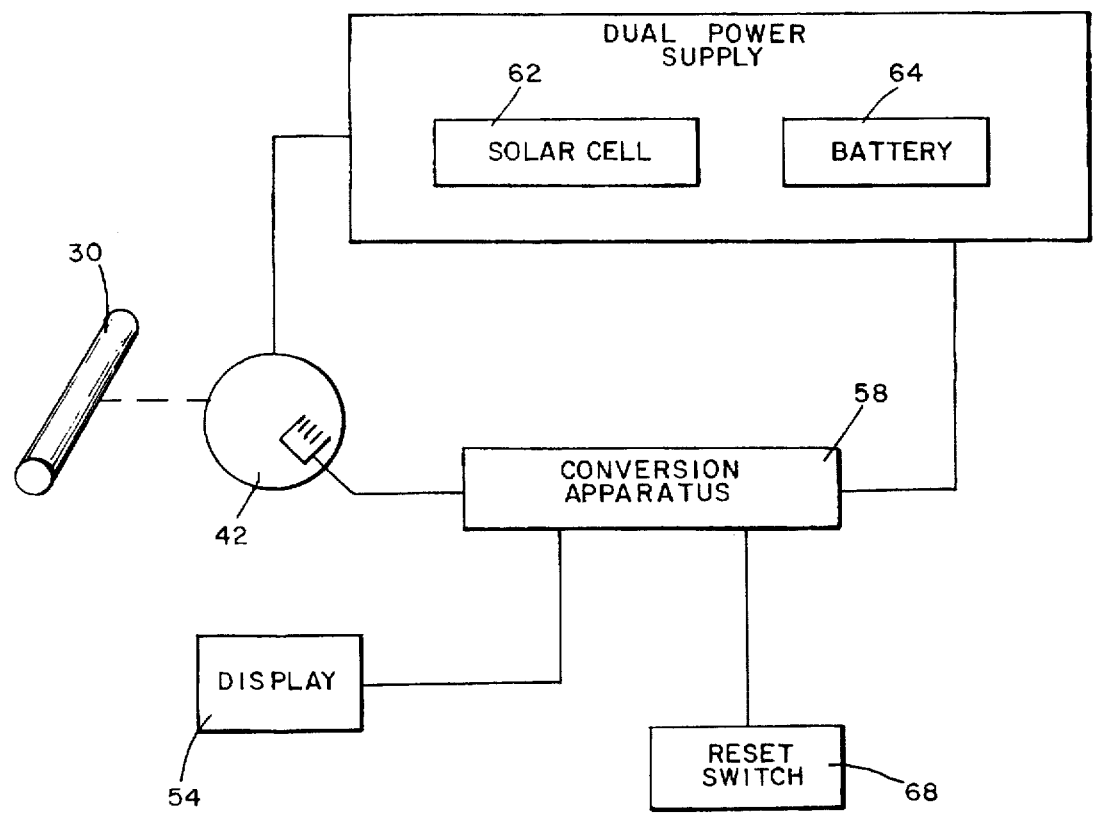
FIG. 2 is an electronic block diagram of the present invention.

Linear movement of the piece of lumber is obtained by the apparatus illustrated in FIGS. 3–5. A roller 30 is mounted on suitable bearings predominantly within back 24 but extends slightly through a slot 32 therein so that a portion of the roller extends beyond the surface of back 24 through slot 32, as best shown in FIG. 5. A secondary roller 34 frictionally contacts roller 30 and is resiliently held there against by one or more springs 36. As best shown in FIG. 5, secondary roller 34 is provided with a central groove 38 into which a cord 40 is positioned.

A disc 42 is spaced from rollers 30 and 34 and is rotatably secured to back 24b by a suitable pivot 44. Disc 42 is provided with a peripheral groove 46 for reception of cord 40. A pair of guide rollers 48 and a tension roller 50 placed under a bias by a spring and lever assembly 52 ensures that cord 40 is maintained in its respective grooves 38 and 46. Upon rotation of roller 30 through contact with and linear movement of a board thereagainst, the rotation of roller 30 is transferred through roller 34 and cord 40 to disc 42. While the pulley and cord arrangement is a preferred mechanism, other mechanism, such as gears, may be used to couple roller 30 and disc 42 together.

The rotational movement of disc 42 is converted by known technology to electrical signals and is coupled to a display 54 through wires 56. Display 54 may comprise a liquid crystal display of conventional construction. The conversion apparatus associated with disc 42 and generally designated by indicium 58 may be formed in any convenient manner, such as by the digital linear measuring device described in U.S. Pat. Nos. 5,027,526 and 5,142,793. In general, disc 42 forms part of an electro-mechanical contact switching arrangement in an electrical circuit that generates electrical pulses corresponding to displacements of blades, such as designated by indicium 60 in FIG. 4. Electrical energy is obtained by a solar battery 62 or a conventional dry cell battery 64. The read out from display 54 may be either in the English or metric system, and one or the other reading is obtained by manipulation of switches operated through buttons 66. Such an alternate English-metric system display is also discussed in the above-mentioned two patents. Display 54 may be set at any desired setting. Because roller 30 is set a distance from the midpoint of aperture 26, the setting of display 54 may be preset to correspond to this distance.

An enclosure comprising several walls, such as a side wall 67a, a back wall 67b and back half 24b, is protectively placed at least about disc 42 and conversion mechanism 58 from sawdust and other debris and dirt, such as when swept into opening 29.

Resetting of display 54 to its predetermined setting is effected by a switch mechanism 68, as best shown in FIGS. 6–12. Switch mechanism 68 includes an arm 70 which is pivoted about a pivot 72. Pivot arm 70 includes a projection 74 of three-dimensionally rounded configuration which extends through an opening 76 in surface 25a of back half 24a. The three-dimensionally rounded configuration of projection 74 enables it to be contacted at any angle by a board without harm to the projection or other parts of switch mechanism 68. Accordingly, the piece of lumber or other material can be slid or fitted into position into the angle formed by base 22 and back 24 of miter box 20 to operate the switch from the left, from the front, from the left, top to bottom, from the top, or from the right.

A spring 78 presses against arm 70 and biases it to its at rest position where projection 74 extends through opening 76 for contact with the surface of a piece of lumber.

Figure 8:
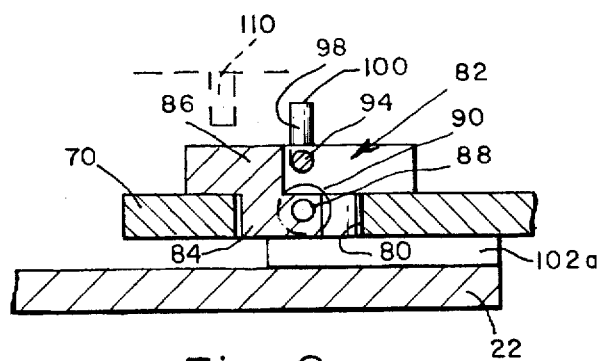
FIG. 8 is a partial view of a part of the switch portion taken along line 8—8 of FIG. 7.

Arm 70 is provided with guiding slot 80 therein. As shown in FIG. 8, a slide 82 which is T-shaped in cross-section has a lower portion 84 which extends within guiding slot 80 and a larger overlapping upper portion 86 which rests atop arm 70 and extends outwardly beyond guiding slot 80. A spring guide rod 88 extends through guiding slot 80 and lower portion 84 of slide 82, so that rod 88 will maintain slide 82 in position with respect to arm 70. A spring 90 is placed within guiding slot 80 and about rod 88, and contacts an end 92 of slide 82 which is opposite from pivot 72, to bias slide 82 towards pivot 72. Upper portion 86 of slide 82 houses an electrical conductor 94 and extends toward pivot 72. A wire 96 is secured to conductor 94 extends to conversion apparatus 58 and thence to display 54 for connection therewith. Electrical conductor 94 terminates at its other end in an upwardly directed portion 98 which forms a contact at its end surface 100. Accordingly, portion 98 and its contact surface 100 are pivotable and linearly movable. They pivot about pivot 72 in an arc when arm 70 is caused to pivot and move linearly along a line passing through pivot 72 for reasons which will become clearer hereinafter.

A pair of supports 102a and 102b space arm 70 from base 22, with support 102b being arced in a curve which follows that of arm 70 as it pivots about pivot 72.

Figure 6:
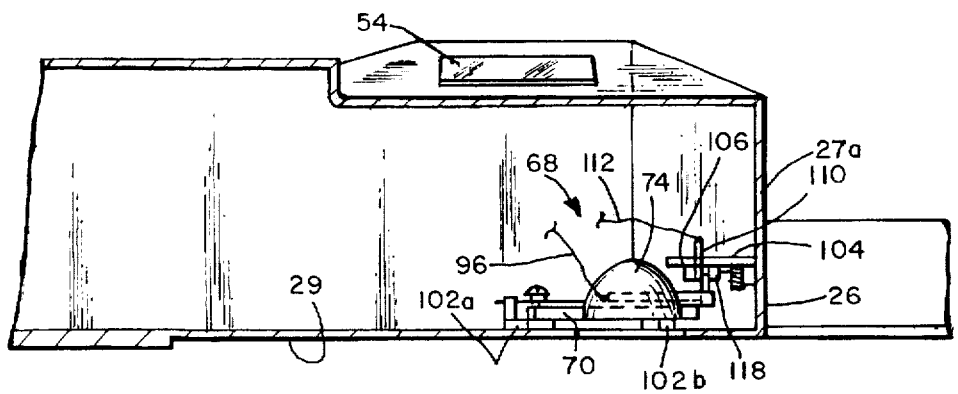
FIG. 6 is partial top view of the embodiment shown in FIG. 3, taken along line 6—6 thereof, with the front panel thereof removed, to illustrate primarily the mechanical switch portion of the electro-mechanical implementation.

As shown in FIG. 6, a cantilevered beam 104 is secured to the interior surface of aperture wall 27a and extends therefrom partially over arm 70. A fixed guide 106 is secured to the bottom of cantilevered beam 104 and is provided with a guiding surface 108 thereon. A fixed contact 110 is also secured to cantilevered beam 104 and is positioned proximate to guiding surface 108 of fixed guide 106. A wire lead 112 extends from fixed contact 110 and is secured at its other end to conversion apparatus 58 and thence display 54.

Figure 7:
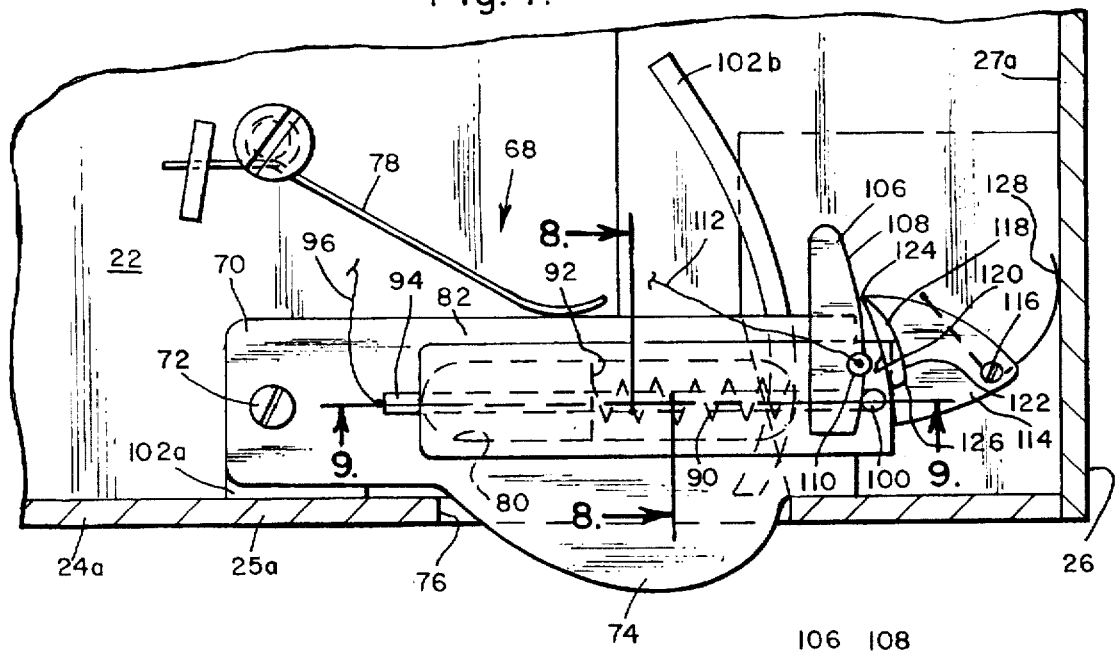
FIG. 7 is a detailed view looking downwardly upon the switch portion shown in FIG. 6, and illustrating the initial positioning of the switch prior to contact by the wood piece.

A pivotable guide support 114 is also secured to the under surface of cantilevered beam 104 by a pivot 116, and carries a guide 118 which is positioned adjacent to fixed guide 106. Moveable guide 118 includes a first curved guiding surface 120, a second curved guiding surface 122, and transitional connecting surfaces 124 and 126 that connects guiding surfaces 120 and 122. A spring 128 exerts a bias on pivotal guide support 114 to place transitional surface 124 of moveable guide 118 in contact with guiding surface 108 of fixed guide 106 when arm 70 is in its at rest position. In this position, as shown in FIG. 7, lead portion 98 and its contact surface 100 are placed at an opening of a path which extends between first curved guiding surface 120 and guiding surface 108, when arm 70 is at rest under bias of its spring 78.

Switch 68 may be enclosed by walls to protect it from sawdust and other debris, such as when swept into opening 29.

Figure 12:
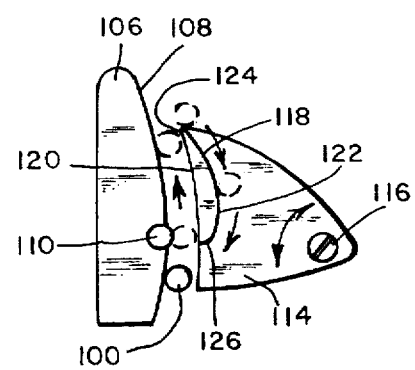
FIG. 12 illustrates a part of the switch portion and details movement of one contact with respect to a stationary contact and of a pivotable cam, as the contact traverses a path from the initial positioning and subsequent movements of the switch as depicted in FIGS. 7–9.
Figure 10:
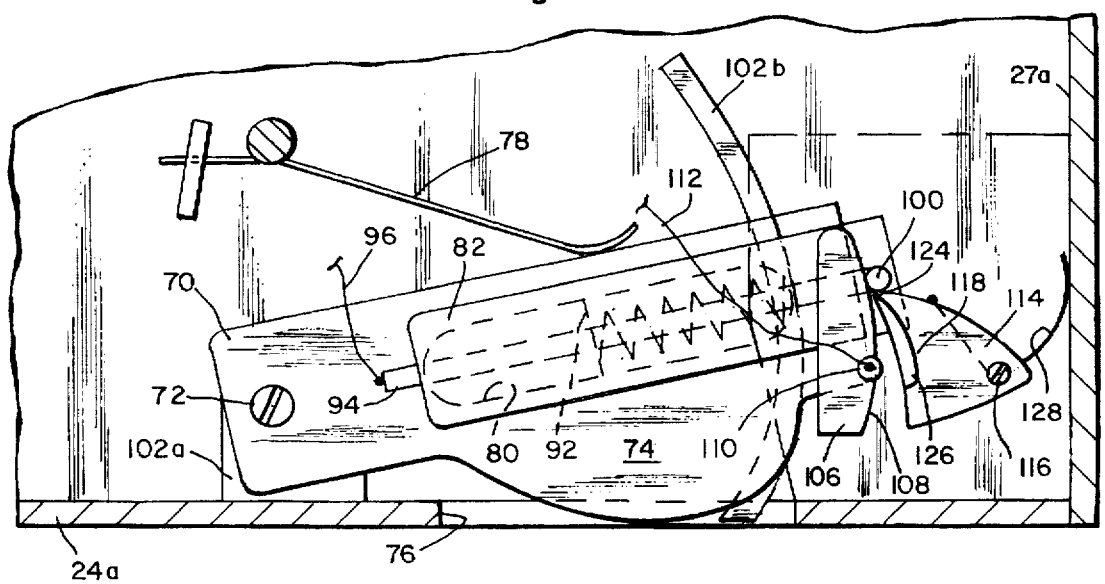
FIGS. 10 and 11 are views of the switch portion similar to that shown in FIG. 7, but illustrating successive movements of one contact along a two-dimensional path after the switch is contacted by the piece of wood.

Operation of switch 68 proceeds as follows. In its at rest position, projection 74 of arm 70 extends beyond surface 25a of back half 24a of miter box 20. When a board or other piece of lumber comes into contact with projection 74, arm 70 is caused to pivot through a carefully constructed path from its at rest position shown in FIG. 7 and the corresponding placement of portion 98 and its contact surface 100. This carefully constructed path is depicted successively in FIGS. 10 and 11. The positioning of moveable contact 98–100 with respect to fixed guide 106 and its guiding surface 108 and movable guide 118 and its surfaces 120 and 122 is shown in FIG. 12. Specifically, when arm 70 is caused to pivot about pivot 72 from its at rest position as depicted in FIG. 7, moveable contact 98–100 progressively traverses its path to make contact with fixed contact 110 to close the circuit leading to display 54 and, thus, to reset it to its predetermined initial setting. The moveable contact then passes beyond transitional surface 124, as depicted in FIG. 10, to permit moveable guide 118 to move toward fixed guide 106 under the bias of spring 128 and thereby to permit contact of transitional surface 124 with guiding surface 108 of fixed guide 106. Switch 68 will remain in this position so long as the board is in contact with projection 74.

Figure 11:
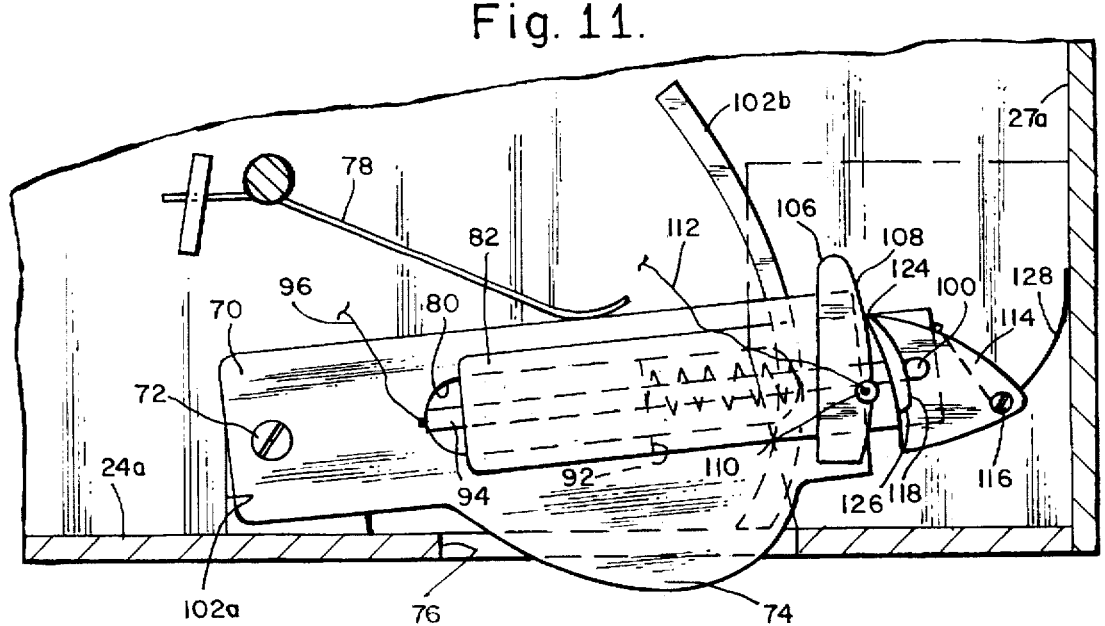
Figure 9:
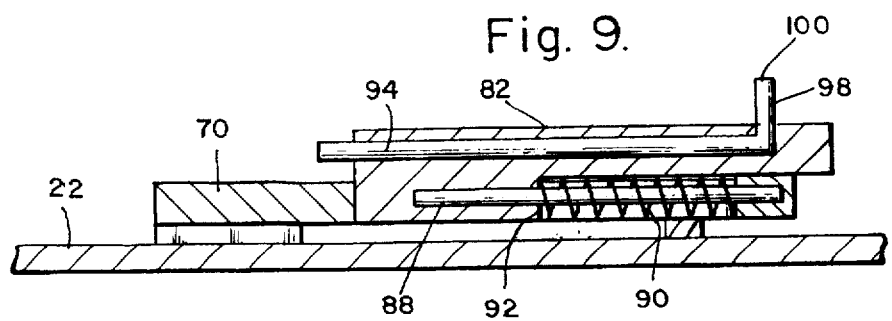
FIG. 9 is a partial view of a part of the switch portion taken along line 9—9 of FIG. 7.

Linear movement of the board against roller 30 will produce a reading on display 54 through the mechanization effected by roller 34, cord 40, disc 42, and conversion apparatus 58. When the proper length of lumber has been obtained, the operator then proceeds to cut the board at the desired angle. At or near this point, the board no longer may remain in contact with projection 74 on arm 70. It is desired that the reading on display 54 remain and not be removed until it is desired to do so. Accordingly, the return pivoting of arm 70 is so arranged that moveable contact 98–100 is prevented from contacting fixed contact 110, and this occurs because moveable contact 98–100 is caused to move along second curve guiding surface 122 of moveable guide 118 as depicted in FIG. 11. Movement of contact 98–100 continues until it passes second transitional surface 126, at which point, contact 98–100 is in the position shown in FIG. 7.

Although the invention has been described with respect to a particular embodiment thereof, it should be realized that various changes and modifications may be made therein without departing from the spirit and scope of the invention.

What is claimed is:

1. Apparatus including a miter box, frame and trim saw, and radial saw in combination with instrumentation for measuring linear movement of lumber therein, comprising:

an apparatus guide having a base, a back, an aperture dividing said base and said back into first and second portions for placing an apparatus saw blade therebetween, and a connection securing said base and said back portions together, said guide permitting linear movement of the lumber relative to said aperture to enable cutting of the lumber by the saw blade; and a measuring device mounted in said guide and having an element contactable with the lumber, thereby to measure linear movement of the lumber on said guide.

2. The combination according to claim 1 in which said measuring device includes an electro-mechanical mechanism having a member movable upon contact with the lumber, a converter coupled to said member and converting movement thereof into electrical signals, and a display coupled to said converter and displaying the signals as units of linear measurement.

3. The combination according to claim 2 in which said switch comprises:

a fixed guide having thereon a curved guiding surface;

a contact fixed with respect to said fixed guide and positioned proximate to said guiding surface thereon;

a contact two-dimensionally movable with respect to said fixed contact and contactable therewith for closing the electric circuit;

a movable guide biased towards said fixed guide, and having a periphery including first and second guiding surfaces spaced from one another, said first curved guiding surface, whose curve emulates and faces said fixed guide guiding surface, defining with said fixed guide guiding surface an entry for passage of said movable contact through a first path;

wherein said movable contact progressively (a) traverses said path between said movable guide first guiding surface and said fixed guide curved guiding surface to make contact with said fixed contact, (b) passes beyond said first guiding surface to permit said movable guide to pivot towards and contact said fixed guide guiding surface, (c) passes along said movable guide second curved guiding surface and against the bias exerted on said slide, thereby to avoid making contact with said fixed contact, and (d) passes beyond the second of said transitional surfaces, thereby to return to its position before said arm was caused to pivot from its at rest position, said switch thereby maintaining the units of measurement on said display until said movable contact is caused to again transverse said path.

4. The combination according to claim 2 further comprising a switch coupled to said display for resetting the units of measurement to a preset value.

5. The combination according to claim 4 in which said movable member is positioned a set distance from the apparatus saw blade and thereby to establish the display preset value.

6. The combination according to claim 4 in which said switch comprises:

a fixed guide having thereon a curved guiding surface;

a contact fixed with respect to said fixed guide and positioned proximate to said guiding surface thereon;

a contact two-dimensionally movable with respect to said fixed contact and contactable therewith for closing the electric circuit;

a movable guide biased towards said fixed guide, and having a periphery including first and second guiding surfaces spaced from one an other, said first curved guiding surface, whose curve emulates and faces said fixed guide guiding surface, defining with said fixed guide guiding surface an entry for passage of said movable contact through a first path;

wherein said movable contact progressively (a) traverses said path between said movable guide first guiding surface and said fixed guide curved guiding surface to make contact with said fixed contact, (b) passes beyond said first guiding surface to permit said movable guide to pivot towards and contact said fixed guide guiding surface, (c) passes along said movable guide second curved guiding surface and against the bias exerted on said slide, thereby to avoid making contact with said fixed contact, and (d) passes beyond the second of said transitional surfaces, thereby to return to its position before said arm was caused to pivot from its at rest position.

7. The combination according to claim 6 in which said arm includes a projection having a three-dimensionally rounded configuration and adapted for contact by the lumber when placed in the apparatus to enable said projection to be contacted at any angle by the lumber without harm to said projection or other parts of said switch.

8. The combination according to claim 2 in which said measuring device includes an electro-mechanical mechanism having:

a roller rotatable upon contact with, and upon linear movement of the lumber;

a converter including a rotatable disc and an electromagnetic energy transducer to convert rotation of said disc into electromagnetic signals;

a connector connecting said roller to said disc; and a display coupled to said converter for displaying the signals as units of linear measurement.

9. The combination according to claim 8 in which said connector comprises a grooved pulley in contact with said roller, a peripheral groove in said disc, a cord disposed in said pulley and disc grooves, and biasing apparatus coupled to said cord to maintain contact between said cord and said grooves.

10. A switch for closing an electric circuit comprising:

a base;

an arm having a guiding slot therein, pivotally secured to said base by a pivot to define an arc curved about said pivot, and biased towards an at rest position;

a slide received within said guiding slot, and biased by biasing means therein towards said pivot;

a guide fixed with respect to said base and having thereon a curved guiding surface, the curve thereof emulating the arc of said arm;

a contact fixed with respect to said fixed guide and positioned proximate to said guiding surface thereon;

a movable guide pivotally secured to said base and biased towards said fixed guide, said movable guide having a periphery including a first curved guiding surface whose curve emulates the arc of said arm, said first curved guiding surface facing said fixed guide guiding surface and defining with said fixed guide guiding surface an entry for passage of said movable contact through a curved path between said guiding surfaces.

a second surface, and transitional surfaces connecting said first and second surfaces;

a contact secured to said slide, and movable with respect to said fixed contact and contactable therewith for closing the electric circuit, the bias exerted on said slide and on said movable contact thereby positioning said movable guide within said curved path;

wherein, when said arm is caused to pivot from its at rest position, said movable contact progressively (a) traverses said path to make contact with said fixed contact and (b) passes beyond a first of said transitional surfaces, thereby to permit said movable guide first curved guiding surface to pivot towards said fixed guide guiding surface, and when said arm is no longer caused to pivot from its at rest position, said movable contact progressively (c) passes along said movable guide second curved guiding surface and against the bias exerted on said slide, thereby to avoid making contact with said fixed contact, and (d) passes beyond the second of said transitional surfaces, thereby to return to its position before said arm was caused to pivot from its at rest position.

11. A switch according to claim 10 in which said arm includes a projection having a three-dimensionally rounded configuration and adapted for contact by a switch-operating medium for enabling said projection to be contacted at any angle by the medium without harm to said projection or other parts of said switch.

12. A switch for closing an electric circuit comprising:

a fixed guide having thereon a curved guiding surface;

a contact fixed with respect to said fixed guide and positioned proximate to said guiding surface thereon;

a contact two-dimensionally movable with respect to said fixed contact and contactable therewith for closing the electric circuit;

a movable guide biased towards said fixed guide, and having a periphery including first and second guiding surfaces spaced from one another, said first curved guiding surface, whose curve emulates and faces said fixed guide guiding surface, defining with said fixed guide guiding surface an entry for passage of said movable contact through a first path;

wherein said movable contact progressively (a) traverses said path between said movable guide first guiding surface and said fixed guide curved guiding surface to make contact with said fixed contact and thereby to close the circuit, (b) passes beyond said first guiding surface to permit said movable guide to pivot towards and contact said fixed guide guiding surface, (c) passes along said movable guide second curved guiding surface and against the bias exerted on said slide, thereby to avoid making contact with said fixed contact, and (d) passes beyond the second of said transitional surfaces, thereby to return to its position before said arm was caused to pivot from its at rest position.

13. A switch according to claim 12 further comprising a member coupled to said movable contact and having a three-dimensionally rounded configuration which permits contact of said member by a switch-operating medium to enable said member to be contacted at any angle by the medium without harm to said member or other parts of said switch.

* * * * *